Nov. 8, 1938. H. J. ANDERSON 2,136,261
PLUNGER TYPE FLUID INDICATOR AND METERING DEVICE
Filed March 2, 1936
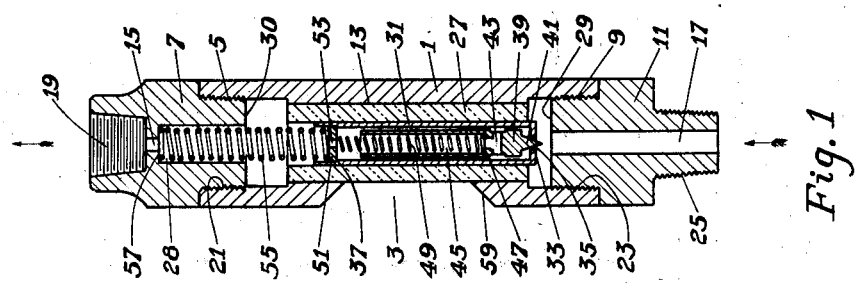
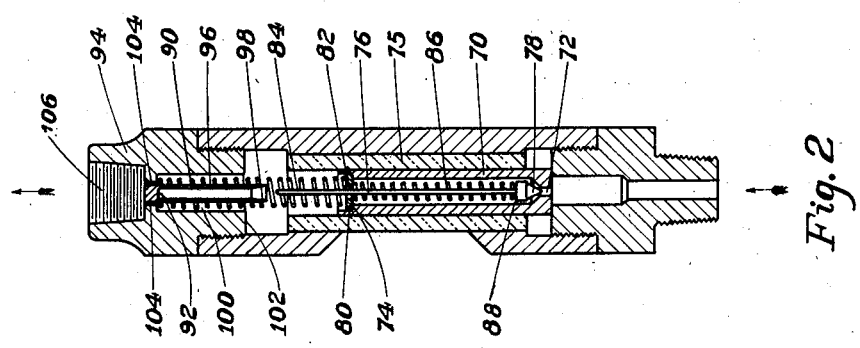
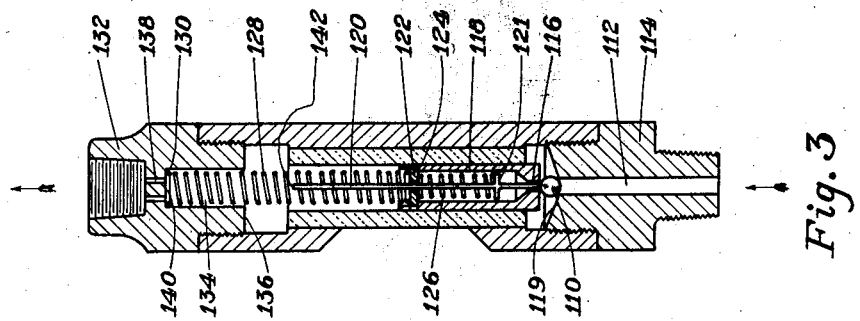
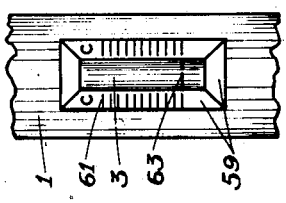
INVENTOR
Harry J. Anderson
BY Edward H. Lang
ATTORNEY Patented Nov. 8, 1938

2,136,261

UNITED STATES PATENT OFFICE 2,136,261

PLUNGER TYPE FLUID INDICATOR AND METERING DEVICE

Harry J. Anderson, Chicago, Ill., assignor to The Pure Oil Company, Chicago, Ill., a corporation of Ohio Application March 2, 1936, Serial No. 66,571

11 Claims. (Cl. 73—194)

This invention relates to plunger type fluid indicating and metering devices more particularly for use in connection with force feed lubricators.

In application Ser. No. 13,005, filed March 25, 1935, by Charles F. Terrell, Jr., now Patent No. 2,047,715, granted July 14, 1936, there is disclosed and claimed devices of the general nature of the devices constituting my invention. My devices, however, include certain modifications and improvements not shown in the aforesaid application.

In my improved device I have provided a transparent cylinder, preferably made of a non-frangible composition material, such as Bakelite, in which a plunger is adapted to reciprocate. The transparent cylinder is preferably encased by or pressed into a metallic cylinder having one or more slots therein in order to permit observation of the plunger. The arrangement of plunger, valve, and springs is such that the device will operate with oil of substantially any viscosity and with any type of lubricator without necessitating any adjustment. The device is leak-proof without the necessity for using washers or packing material.

In addition to the novel features already pointed out, other important improvements will be evident after reading the following description in conjunction with the accompanying drawing, of which Fig. 1 is a full size vertical cross-sectional view of the device in accordance with my invention.

Fig. 2 is a vertical cross-sectional view of a modified form of device in accordance with my invention.

Fig. 3 is a vertical cross-sectional view of a third modification of my device.

Fig. 4 is a fragmentary diagrammatic elevational view of a portion of the device.

Referring to Figures 1 and 4, the numeral 1 indicates an open ended cylindrical metallic casing having therein one or more slots 3 intermediate the ends thereof. The upper end of the casing is internally threaded at 5 in order to receive the top closure 7. The lower end is internally threaded at 9 in order to receive the lower closure 11. The casing 1 is preferably die-cast out of suitable metal or it may be made by drilling, forging or other operation. The inside wall 13 is machined to a smooth sliding surface. The upper and lower closures 7 and 11 are also preferably die-cast with the passageways 15 and 17 respectively. The upper end is threaded at 19 to receive suitable pipe nipple and at 21 to screw fit into the upper end of the casing 1. The lower end 11 is threaded at 23 to screw fit into the casing 1 and at 25 in order to receive a suitable coupling.

A transparent cylindrical hollow tube 27, preferably of nonfrangible composition, is press-fitted in the casing 1 intermediate the ends thereof. In order to properly fit the tube 27 in the casing, it is first hollowed by drilling a hole therethrough of the approximate diameter desired. The tube is then pressed into the casing so as to fit tightly therein without leaking. The tube 27 is broached or reamed to the desired diameter. Suitable material for making the tubing is transparent Bakelite or other organic condensation products. The outer surface of the tubing 27 is machined to substantially the same diameter as the inner diameter of the casing 1 thereby enabling a tight fit to be made without the necessity for using washers or packing material. The tubing 27 should be sufficiently long to extend beyond the ends of the slot 3 and to permit sufficient sliding surface for a plunger to be subsequently described. The diameter of the bore of the tubing 27 is larger than the diameter of the passageway 17 and the hollow portion 28 of the closure 7, and the center line of the bore is preferably coincident with the center line of the passageway 17. The lower end of the tube 27 preferably stops short of the upper face 29 of the lower end 11 and the upper end of the tube stops short of the inner face 30 of the closure 7.

A hollow plunger 31 of known displacement is adapted to fit snugly within the tube 27 and reciprocate therein. The bottom face 33 of the plunger has an opening 35 at the center thereof. A shoulder 37 is formed on the inside wall of the plunger a short distance from the upper end thereof. An elongated valve dart 39 is loosely mounted within the plunger 31 and is adapted to move therein. The lower end of the valve dart is formed with a tapered point 41 which is adapted to seat in the opening 35 and form a closure therefor. A short distance above the lower end of the valve dart a horizontal passageway 43 is bored therethrough and connects with a longitudinal passageway 45 which extends to the upper end of the valve dart. A shoulder 47 is formed on the inner wall of the valve dart a short distance above the passageway 43.

A relatively low tension coil spring 49 is mounted in the passageway 45 of the valve dart and extends beyond the upper end thereof. A spring follower 51, having a passageway 53 through the center thereof, is mounted in the upper end of the plunger 31 and is of such diameter that it cannot pass downwardly beyond the shoulder 37 of the plunger 31. The follower 51 is adapted to slide in the upper end of the plunger 31. The upper end of the spring 49 is adapted to abut against the follower 51 and the lower end of the spring is adapted to abut against the shoulder 47.

A second coil spring 55 of relatively high tension is mounted in the upper end of the device and the lower end of this spring abuts against the upper face of the follower 51 while the upper end of the spring abuts against the inner face 57 of the top closure 7. The tension of the springs will depend in a large measure upon the relative weights of the valve dart and plunger, the area of the opening 35 and the area of the bottom face of the plunger exposed to fluid pressure, but I have found that in a device of the size shown herein, the spring 55 may be of such tension that a force of .35 pound is required to compress it one inch, whereas the spring 49 may be of such tension that a force of .15 pound is required to compress it one inch. With springs of this relative tension the device can be used with oils of substantially any viscosity.

The edges of the slot 3 may be bevelled as shown at 59, and the sides of the slot may be calibrated as shown at 61 in any units, preferably cubic centimeters.

The device operates as follows: Oil is pumped into the device through the passageway 17 at which time the bottom 33 of the plunger 31 rests on the inner face 29 of the lower closure 11. The effective force due to pressure of the oil on the bottom face of the plunger being greater than the effective force due to pressure on the portion of the valve dart exposed to the oil, the plunger will rise with the valve in closed position. While the valve is rising the spring follower 51 will be seated on the shoulder 37 and the spring 55 will be gradually compressed. The plunger is forced upwardly until the upper end thereof strikes the face 30 of the closure 7 and its upward motion is stopped. At this instant valve 39 rises thereby opening the passageway 35. The spring 55 quickly forces the plunger 31 downwardly to its initial position with its bottom face resting on the inner face 29 of the lower closure 11, displacing the fluid contained in the lower portion of the device and forcing it up through the opening 35, around the side of the valve, through the passageways 43, 45 and 53, into the space above the plunger. The combined action of the spring 55, follower 51, and spring 49 also forces the valve dart back to its initial position, but due to the fact that the spring 49 is lighter than the spring 55 and due to the resistance of the velocity head of oil passing through the opening 35, the valve will lag somewhat behind the plunger thereby permitting the plunger to reach its lowermost position before the opening 35 is closed. Upon the return of the plunger and valve to the lowermost position, the cycle starts over again. During the up-stroke of the plunger the oil in the space above it is forced out through the passageway 15.

By placing a visible line or band 63 around the outer periphery of the plunger 31, the distance of upward travel of the plunger can be easily observed through the slots in the casing, and if desired, by observing the time required for the line to travel from one position to another position on the scale, the volume of fluid pumped in any given time can be determined.

The device shown in Fig. 2 differs from the device shown in Fig. 1 primarily in the type of valve used and in the provision of means as part of the upper closure to retard the downward motion of the valve. The casing, tubing, plunger, springs, spring follower, and the lower closure may be substantially like those shown in Fig. 1. A hollow plunger 70, having a small vertical passageway 72 at the bottom thereof and a shoulder 74 on the inner wall a short distance from the top thereof, fits snugly in the tubing 75 and is adapted to reciprocate therein. The valve dart 76 is loosely mounted in the plunger with the point 78 on the lower end of the dart adapted to seat in and close the passageway 72. A spring follower 80 is mounted in the upper end of the plunger 70 and is adapted to seat on the shoulder 74 and slide in the upper end of the plunger. The follower 80 has a passageway 82 at the center thereof sufficiently large to allow space around the valve stem 84 which passes therethrough. The coil spring 86 surrounds the stem 84 and abuts at its lower end against the upper face 88 of the valve point 78 and the upper end of the spring abuts against the lower face of the spring follower 80. A second coil spring 90, heavier than the spring 86, abuts at its lower end against the upper face of the spring follower 80 and the upper end of the spring 90 abuts against the face 92 of the upper casing closure 94. The upper closure 94 is cast with a centrally disposed, downwardly extending cylindrical portion 96, the inner wall of which is tapered outwardly at the lower end 98. The space 100 is provided between the cylindrical portion 96 and the main body of the closure 94. The outer diameter of the concentric space 100 is less than the diameter of the plunger 70 in order to permit the upper end of the plunger to abut against the face 102. One or more holes 104 are drilled through the closure 94 in order to connect the space 100 with the outlet 106. The distance from the top of the plunger 70, in its lowermost position, to the face 102 is less than the distance from the top of the valve stem 84, in its lowermost position, to the face 92.

The operation of the device shown in Fig. 2 is substantially like that shown in Fig. 1. However, additional means is provided to cause the valve 76 to lag behind the plunger during the descent thereof. This additional lag is accomplished by means of the cylindrical portion 96 into which the stem 84 of the valve projects during the upward motion of the valve and plunger. The stem is of sufficient diameter relative to the inside diameter of the cylinder 96 so that when the valve moves downwardly a slight suction effect will be produced in the presence of lubricant thereby retarding the downward stroke of the valve. Likewise, during the up-stroke, pressure will be exerted on the stem, thereby insuring that the valve remains closed until the completion of the up-stroke.

Referring to Fig. 3, the casing, tubing, plunger, springs, and spring follower may be substantially identical with those of Fig. 1. A ball valve 110 is adapted to seat between the upper end of the passageway 112 in the lower closure 114 and the lower end of the passageway 116 in the plunger 118. The inner face 119 of the lower closure 114 is preferably sloped downwardly from the edges to the passageway 112 to insure that the ball valve seats properly. A stem 120, provided with a spider or collar 121 adjacent the lower end, extends through the vertical passageway 116. The lower end of the stem 120 is adapted to press against valve 110. The passageway is large enough to permit oil to pass readily therethrough. The spring follower 122 is adapted to seat on the shoulder 124 formed near the upper end of the plunger 118 and slide in the upper end of the plunger. A coil spring 126 is arranged to abut against the spider 121 at its lower end and against the lower face of the spring follower at its upper end. A second coil spring 128, heavier than spring 126, is adapted to abut at its lower end against the upper face of the spring follower and at its upper end against the face 130 of the upper closure 132. The closure member 132 is formed with the cylindrical passageway 134. The diameter of the passageway may be less than the outside diameter of the plunger 118 thereby enabling the upper end of the plunger to abut against the face 136 of the closure. One or more holes 138 are drilled vertically through the closure member 132 at a distance from the center thereof to connect the passageway 134 to the outlet. The distance from the upper end of the plunger 118, when in its lowermost position, to the face 136 is greater than the distance from the upper end 142 of the stem or rod 120, when in its lowermost position, to the face 140 of the top closure 132.

The operation of this device is as follows: As fluid is forced into the inlet the plunger and valve are forced upwardly. The pressure of the fluid against the ball valve 110 is sufficient to prevent the stem 120 and spring 126 from unseating it. At the instant the upper end 142 of the stem strikes the face 140 of the closure member, the valve is pushed away from the opening 116 and drops freely back to the bottom. The plunger will be rapidly returned to its lowermost position by the spring 128 and the action of the spring 126 on the rod 120 will insure that the ball valve does not close the passageway 116 until the plunger reaches its lowermost position. The downward movement of the plunger displaces the oil beneath it and forces the oil through the opening 116 upwardly toward the outlet.

The outer casing and closures of the devices made in accordance with my invention are preferably cast from bronze or brass but may be made by any other suitable operation. The plunger, valve, springs, etc., forming the inner mechanism, are preferably made of steel. It will be apparent that glass may be used in place of non-frangible material but with consequent loss of the advantages attendant upon pressfitting and absence of washers and packing material.

It will be understood that although I have shown three specific modifications of my invention, the invention is not limited to the modifications shown, but is intended to cover broadly the novel features shown and described herein.

What I claim is:

1. An indicating and/or metering device comprising a cylinder having an inlet and an outlet on opposite ends thereof, a plunger snugly mounted in said cylinder and adapted to reciprocate therein, there being a passageway through said plunger, a valve adapted to close said passageway, a spring follower adapted to slide inside said plunger, a spring adapted to hold said valve normally in closed position, a second spring of greater tension than said first mentioned spring adapted to return said plunger to its initial position, said springs abutting opposite faces of said spring follower, and means cooperating with fluid pressure, to cause said valve to open when the plunger has reached the end of its stroke.

2. A device in accordance with claim 1 including means for permitting observation of said plunger.

3. An indicating and/or metering device comprising a hollow cylinder having an inlet and an outlet at opposite ends, a plunger snugly mounted in said cylinder and adapted to reciprocate therein, there being a passageway through said plunger connecting said inlet and outlet, a valve adapted to close said passageway and adapted to open in the direction of the forward stroke of said plunger, an elongated stem affixed to said valve, a cylinder closed at one end into which said valve stem is adapted to project during the forward stroke of the plunger, said stem and said last mentioned cylinder cooperating to retard return of said valve to closed position, and a detent for said plunger cooperating with fluid pressure to open said valve when the plunger has reached the end of its stroke.

4. A device in accordance with claim 3 in which means is provided for permitting observation of said plunger.

5. An indicating and/or metering device comprising a cylinder having an inlet and an outlet at opposite ends thereof, a plunger snugly mounted in said cylinder and adapted to reciprocate therein, there being a passageway in said plunger connecting said inlet and said outlet, a valve adapted to close said passageway, said valve being held in closed position by fluid pressure during the forward stroke of the plunger, a rod mounted in said plunger with one end in contact with said valve, a spring adapted to press said rod against said valve, and a detent cooperating with said rod to open said valve when the plunger has reached the end of its stroke.

6. A device in accordance with claim 5 in which means is provided for permitting observation of said plunger.

7. A device in accordance with claim 5 including a second spring mounted in said cylinder in a position to oppose the forward stroke of said plunger, said spring being of greater tension than said first mentioned spring.

8. An indicating and/or metering device comprising a cylinder having an inlet and an outlet, a plunger adapted to reciprocate in said cylinder, there being a passageway through said plunger, a valve adapted to close said passageway, a spring follower adapted to slide inside said plunger, a spring adapted to force said valve back to its initial closed position, a second spring of greater tension than said first mentioned spring adapted to return said plunger to its initial position, said springs abutting opposite faces of said spring follower, and a detent cooperating with fluid pressure, to cause said valve to open.

9. An indicating and/or metering device comprising a cylinder having an inlet and an outlet, a plunger adapted to reciprocate in said cylinder, there being a passageway through said plunger, a valve adapted to close said passageway, a valve stem in said passageway, a spring follower in said cylinder, said spring follower being movable relative to said plunger and said valve, a coil spring in said cylinder abutting at one end against one face of said spring follower and abutting at the other end against the outlet end of said device, a second coil spring of lesser tension than said first mentioned spring abutting at one end against the opposite face of said spring follower and abutting at the other end against a shoulder formed integrally with said valve stem, and a detent cooperating with fluid pressure, to cause said valve to open.

10. Device in accordance with claim 9 in which the cylinder is composed of transparent, non-frangible material.

11. An indicator and/or metering device comprising a metallic casing, a non-frangible hollow cylinder composed of synthetic resin, a portion at least of which is transparent, press-fitted into said casing from one end thereof in order to prevent leakage without the aid of sealing means, top and bottom closures for said casing having an outlet and inlet respectively, a slot in said casing opposite said transparent portion of said cylinder, and a plunger in said cylinder adapted to reciprocate therein past said slot.

HARRY J. ANDERSON.